US012098654B2

(12) United States Patent
Rhodes et al.

(10) Patent No.: US 12,098,654 B2
(45) Date of Patent: Sep. 24, 2024

(54) BI-CAST TRAILING EDGE FEED AND PURGE HOLE COOLING SCHEME

(71) Applicants: Rolls-Royce Corporation, Indianapolis, IN (US); Rolls-Royce North American Technologies Inc., Indianapolis, IN (US)

(72) Inventors: Jeffrey F. Rhodes, Indianapolis, IN (US); Jack Moody, Indianapolis, IN (US); Jerry Layne, Indianapolis, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 36 days.

(21) Appl. No.: 17/558,137

(22) Filed: Dec. 21, 2021

(65) Prior Publication Data

US 2023/0193768 A1 Jun. 22, 2023

(51) Int. Cl.
*F01D 9/04* (2006.01)
*F01D 5/18* (2006.01)

(52) U.S. Cl.
CPC ............. *F01D 9/041* (2013.01); *F01D 5/187* (2013.01); *F01D 9/042* (2013.01); *F05D 2230/21* (2013.01); *F05D 2240/122* (2013.01); *F05D 2260/201* (2013.01); *F05D 2260/232* (2013.01); *F05D 2260/30* (2013.01)

(58) Field of Classification Search
CPC . F01D 5/18; F01D 25/12; F01D 5/187; F01D 25/14; F01D 9/065; F01D 9/041; F01D 9/042; F05D 2260/20; F05D 2240/81; F05D 2230/21; F05D 2240/122; F05D 2260/201; F05D 2260/232; F05D 2260/30
See application file for complete search history.

(56) References Cited

U.S. PATENT DOCUMENTS

| | | | | |
|---|---|---|---|---|
| 5,797,725 | A | 8/1998 | Rhodes | |
| 7,004,720 | B2 | 2/2006 | Synnott et al. | |
| 8,707,713 | B2 | 4/2014 | Levasseur et al. | |
| 9,803,486 | B2 * | 10/2017 | Freeman | F01D 5/189 |
| 9,856,747 | B2 | 1/2018 | Davis et al. | |
| 9,945,250 | B2 | 4/2018 | Kitamura et al. | |
| 9,988,935 | B2 | 6/2018 | Hill et al. | |
| 10,208,621 | B2 | 2/2019 | Hoefler et al. | |
| 10,577,944 | B2 | 3/2020 | Clark et al. | |
| 10,996,140 | B2 | 5/2021 | Barker et al. | |

(Continued)

*Primary Examiner* — Courtney D Heinle
*Assistant Examiner* — Andrew Thanh Bui
(74) *Attorney, Agent, or Firm* — Barnes & Thornburg LLP

(57) ABSTRACT

A gas turbine nozzle guide vane structure includes a vane shaped as an airfoil and having a vane trailing edge, an endwall including an opening to receive an end of the vane, and an element securing the endwall and the vane to each other. Clearance remaining between the endwall and the vane defines a plenum to feed cooling air to the vane at a location adjacent the vane trailing edge. Certain arrangements may have a purge groove defined in at least one of the endwall and the vane and located between the endwall and the vane to receive cooling fluid supplied. In certain arrangements, the structure may include a cover sheet on the endwall defining a gap with the vane, the purge groove configured to receive cooling fluid that exits through the gap.

17 Claims, 14 Drawing Sheets

(56) References Cited

U.S. PATENT DOCUMENTS

| | | | | |
|---|---|---|---|---|
| 11,028,700 | B2 | 6/2021 | Arisi et al. | |
| 11,053,809 | B2 | 7/2021 | Osgood et al. | |
| 2013/0004294 | A1* | 1/2013 | Marra | F01D 11/006 29/889.22 |
| 2016/0177749 | A1 | 6/2016 | Brandl et al. | |
| 2017/0081961 | A1* | 3/2017 | Brandl | F01D 9/042 |
| 2018/0298769 | A1 | 10/2018 | Jeong et al. | |
| 2019/0277676 | A1* | 9/2019 | Koenig | G01F 1/44 |
| 2021/0215051 | A1 | 7/2021 | Koenig et al. | |

* cited by examiner

BI-CAST TRAILING EDGE FEED AND PURGE HOLE COOLING SCHEME

TECHNICAL FIELD

This disclosure relates to a cooling arrangement for an endwall in a gas turbine engine.

BACKGROUND

Present cooling mechanisms for endwalls suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
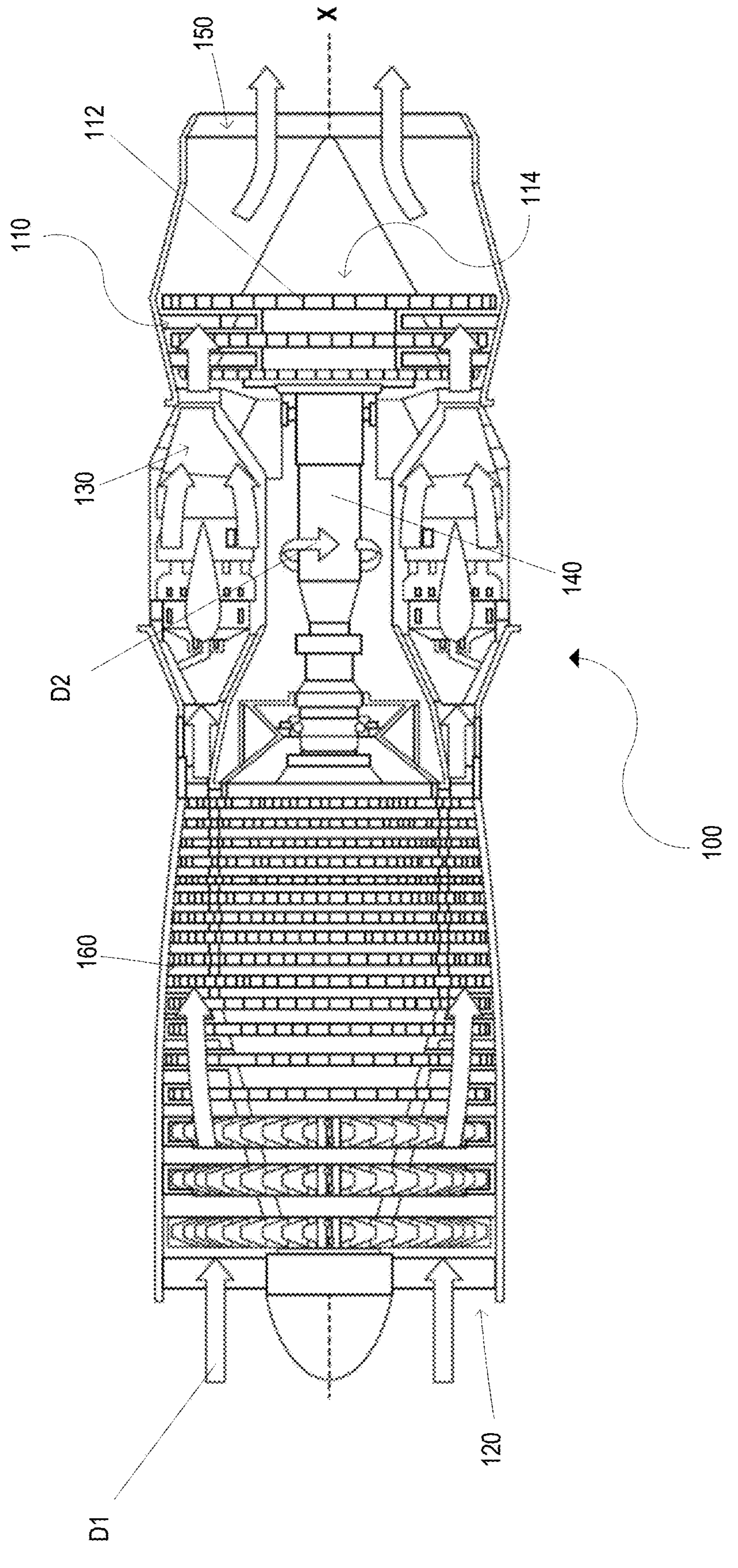
FIG. 1 illustrates a cross-sectional view of an example of a gas turbine engine.

FIG. 1 is a cross-sectional view of one example of a gas turbine engine 100. In some examples, the gas turbine engine 100 may supply power to and/or provide propulsion of an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively or in addition, the gas turbine engine 100 may be utilized in a configuration unrelated to an aircraft such as, for example, an industrial application, an energy application, a power plant, a pumping set, a marine application (for example, for naval propulsion), a weapon system, a security system, a perimeter defense or a security system.

The gas turbine engine 100 may take a variety of forms in various embodiments. Though depicted as an axial flow engine, in some forms the gas turbine engine 100 may have multiple spools and/or may be a centrifugal or mixed centrifugal/axial flow engine. In some forms, the gas turbine engine 100 may be a turboprop, a turbofan, or a turboshaft engine. Furthermore, the gas turbine engine 100 may be an adaptive cycle and/or variable cycle engine. Other variations are also contemplated. The gas turbine engine 100 may include an intake section 120, a compressor section 160, a combustion section 130, a turbine section 110, and an exhaust section 150. During operation of the gas turbine engine 100, fluid received from the intake section 120, such as air, travels along the direction D1 and may be compressed within the compressor section 160. The compressed fluid may then be mixed with fuel and the mixture may be burned in the combustion section 130. The combustion section 130 may include any suitable fuel injection and combustion mechanisms. The hot, high pressure fluid may then pass through the turbine section 110 to extract energy from the fluid and cause a turbine shaft of a turbine 114 in the turbine section 110 to rotate, which in turn drives the compressor section 160. Discharge fluid may exit the exhaust section 150.

As noted above, the hot, high pressure fluid passes through the turbine section 110 during operation of the gas turbine engine 100. As the fluid flows through the turbine section 110, the fluid passes between adjacent blades 112 of the turbine 114 causing the turbine 114 to rotate. The rotating turbine 114 may turn a shaft 140 in a rotational direction D2, for example. The blades 112 may rotate around an axis of rotation, which may correspond to a centerline X of the turbine 114 in some examples.

Figure 2:
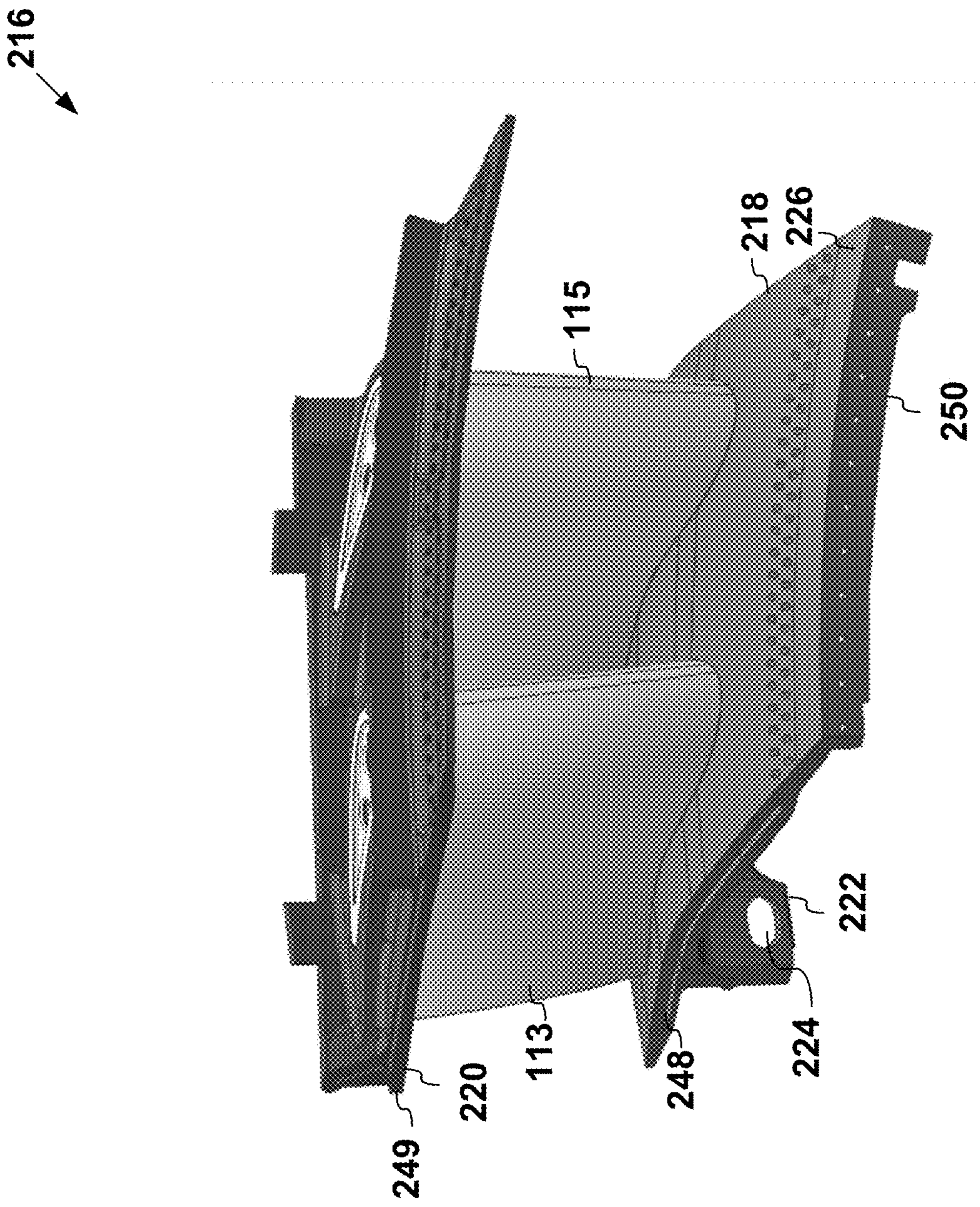
FIG. 2 is an enlarged perspective view of one of multiple sections that may be joined together to collectively form an array of nozzle guide vanes for the turbine.

FIG. 2 is a perspective view of one section 216 of multiple sections (not shown) that may be joined together to collectively form an array of stationary vanes 115 used to guide gas received from the combustion section 130 toward the blades 112 of the turbine 114. These vanes 115 may also be referred to as nozzle guide vanes (NGVs). Although the section 216 shown in FIG. 2 has two adjacent vanes 115, it is to be understood that each section 216 may have three or more vanes, only a single vane 115, or a variable numbers of vanes. Each vane 115 of the section 216 illustrated may extend substantially radially between a radially inner vane endwall 218 and a radially outer vane endwall 220. The vane endwalls 218 and 220 are similar in construction, and so the detailed description of the inner endwall 218 supplied below should be recognized as equally applicable to the outer vane endwall 220. The inner vane endwall 218 may include a flange 222 by which the section 216 may be secured in position between the combustion section 130 and the turbine section 110 shown in FIG. 1. The flange 222 may include apertures 224 adapted to receive bolts, screws, rivets, or other suitable fasteners (not shown), used to attach the flange 222 and a mount section within the gas turbine engine 100 together. Attachments between the flanges 222 of the sections 216 and a mount section (not shown) within the engine 100 provides for retention of the vanes 115 in position as the turbine blades 112 rotate together with the shaft 140 in the rotational direction D2.

Various procedures have been considered herein for cooling vane endwalls. One such procedure is effusion cooling, which involves forming the endwalls at least partly from a porous material and forcing a gas coolant under pressure through the porous material, thereby absorbing heat from the material and forming a heat insulating layer on the exposed endwall surface. One possible drawback to effusion cooling is its low effectiveness. Adding too many holes to the endwalls may also lead to spoiling loss.

Another vane endwall cooling procedure involves ballistic cooling, which may be accomplished via holes through which cooling air or other gaseous coolant is jetted into the mainstream gas upstream of the vanes 115 in order to dilute hot gas received from the combustion section 130 and reduce a mainstream gas temperature adjacent the endwalls of the vanes. Ballistic cooling is less effective far downstream due to diffusion of the cooling air or other coolant, and an efficiency penalty is imposed on the turbine.

Yet another vane endwall cooling procedure is by way of impingement cooling. Impingement cooling utilizes an array of jets of high velocity fluid that are made to strike a target surface. In the case of the section 216 shown in FIG. 2, such target surfaces may include each of the endwalls 218 and 220 such that, upon striking the endwalls 218 and 220, the jets cool the endwalls. Certain impingement cooling arrangements utilizing brazed plates may be susceptible to cracking along braze joints. At an axial end opposite the flange 222, the endwall 218 may have a depending flange 250, discussed later.

Figure 3:
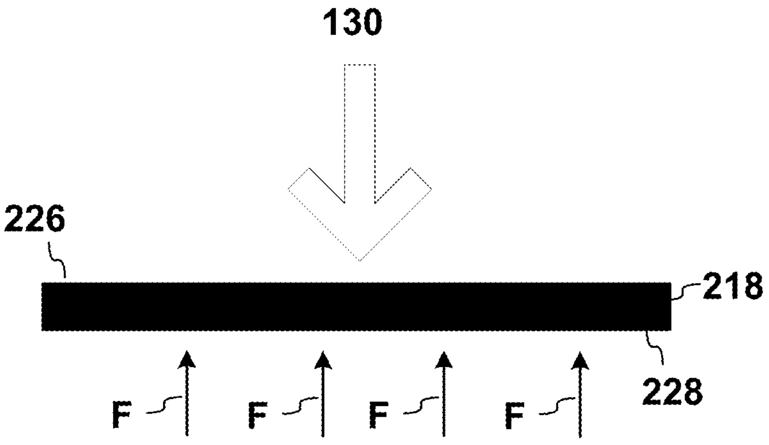
FIG. 3 is a schematic representation used to aid in a discussion of the manner in which impingement cooling may be used to control the temperature of a turbine vane endwall.

FIG. 3 is a schematic representation used to aid in a discussion of the manner in which the impingement cooling mentioned may be used to control the temperature of an endwall such as either of the endwalls 218 and 220. Assuming that the endwall schematically shown in FIG. 3 is the endwall 218, a heat load generated by the combustion section 130 (FIG. 1) may be applied to a frontside endwall surface 226. To assist in this discussion, this endwall surface 226 is identified both in FIG. 2 and in FIG. 3. Pressurized cooling fluid F, such as air, may be directed in a suitable manner to a second, backside endwall surface 228 opposite the surface 226. The endwall 218 shown in FIG. 3 is a solid endwall, without passages providing fluid communication between the surfaces 226 and 228.

Figure 4:
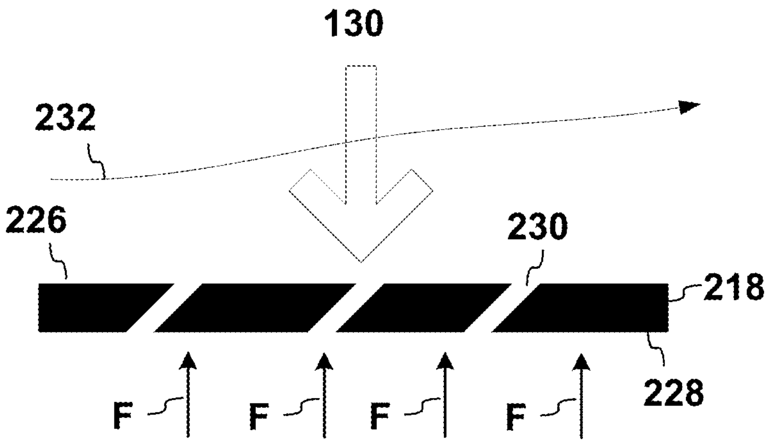
FIG. 4 is a schematic representation used to aid in a discussion of a manner in which a combination of impingement cooling and convective cooling may be used to control the endwall temperature.

FIG. 4 is a schematic representation used to aid in a discussion of a manner in which a combination of impingement cooling and convective cooling may be used to control the temperature of an endwall such as either of the endwalls 218 and 220 represented in FIG. 2. The endwall 218 schematically shown in FIG. 4 may be a radially inner vane end wall similar to the endwall 218 of FIG. 3 but may also include passages 230 permitting fluid communication between the frontside endwall surface 226 and the backside endwall surface 228. Once again, pressurized cooling fluid F, such as air, may be directed in a suitable manner to the backside surface 228. In this case, the cooling fluid may flow from the backside surface 228 to the frontside surface 226 through the passages 230 to produce a cooling fluid barrier 232 disposed over the frontside surface 226. The barrier 232 may be located between the frontside surface 226 and the heat load produced by the combustion section 130.

A combination of impingement cooling, convective cooling, and sub-surface micro cooling may also be used to control the temperature of an endwall such as either of the endwalls 218 and 220 of FIG. 2. The effect of impingement cooling may change with angle, with normal to the surface providing the greatest effect, and tangent to the surface providing the least effect. Referring again to FIG. 2, the structure of the flange 222 may make it difficult to get coolant to a hot spot and at a normal angle. A platform or manifold hole may conceivably be used to deliver cooling air closer to a hot spot and feed additional holes.

Figure 5:
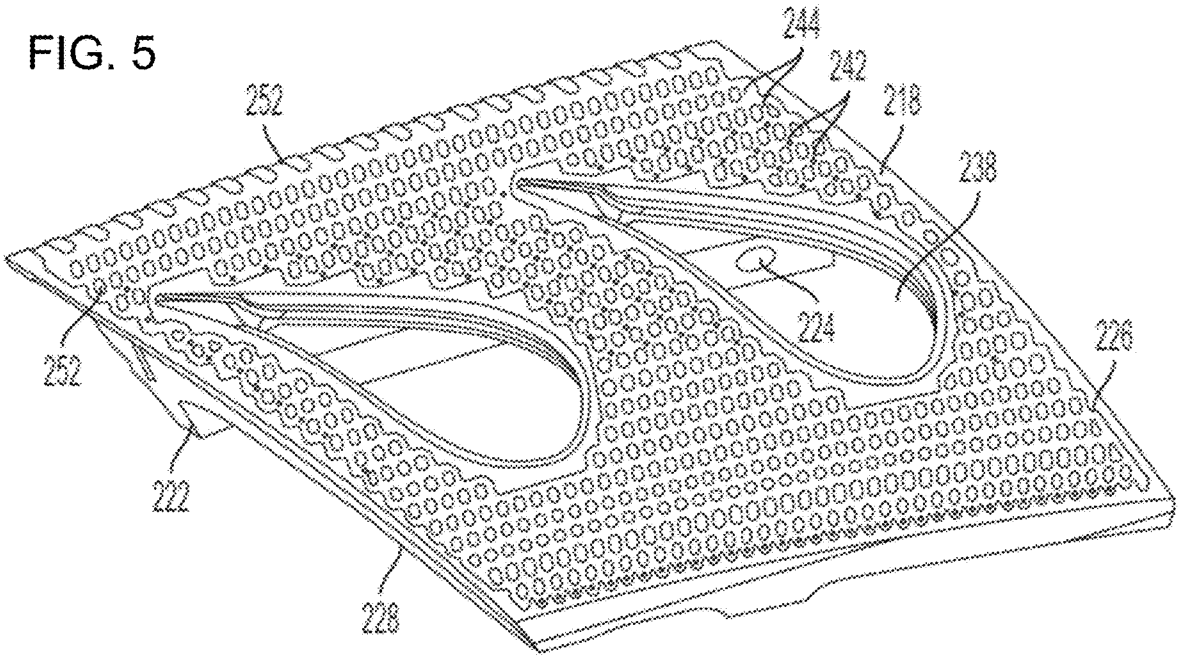
FIG. 5 is a perspective view of a section of a vane endwall with a coversheet removed.

FIG. 5 supplies a view in perspective of a section of the vane endwall 218 of the section 216 shown in FIG. 2 with its coversheet removed to facilitate discussion. Such a section may be incorporated as of one of multiple sections to be joined together into a complete, annular, radially inner vane endwall 218. The configuration illustrated in FIG. 5 may be part of an arrangement, which delivers a highly effective dual-wall geometry with a high strength diffusion-bond process that bonds the coversheet (not shown) to the vane endwall 218. The vane endwall 218 shown in FIG. 5 is designed to have a heat load generated by the combustion section 130 applied to its frontside surface 226. The arrangement shown in FIG. 5 also includes a flange 222, configured and operating similar to the flange 222 included in FIG. 2, and apertures 224, configured and operating similar to the apertures 224 included in FIG. 2. Partial flows of the pressurized cooling fluid directed to a backside surface 228 may be admitted by way of holes 242 into channels 244. The pressurized cooling fluid admitted into the channels 244 may then be exhausted from those channels 244 through film holes 246 (FIG. 6), forming a cooling fluid barrier similar to the barrier 232 represented in FIG. 4. As will be explained in connection with FIG. 8, passages formed collectively by the holes 242, the channels 244, and the holes 246 deliver high cooling performance close to the frontside surface 226, i.e. the hot surface, with cooling performed in this way requiring less cooling air than ballistic and effusion techniques. A higher strength joint that may tolerate temperatures in the turbine, and that is more robust than braze plate heat exchangers commonly used at junctions between turbine vanes and supports associated with those vanes, results. FIG. 5 also illustrates upstanding pedestals 252 and the holes 246 mentioned distributed over the frontside surface 226, i.e. the hot surface, of the arrangement shown.

Figure 6:
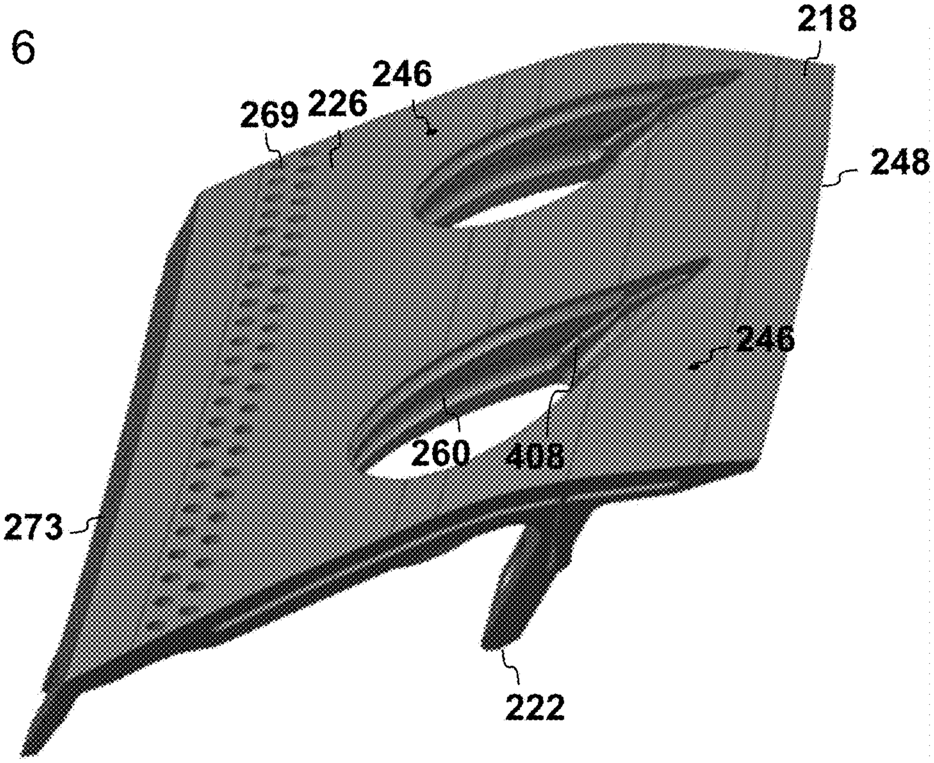
FIG. 6 is a perspective view of a vane endwall at a different angle than FIG. 5 and with the coversheet in place.
Figure 7:
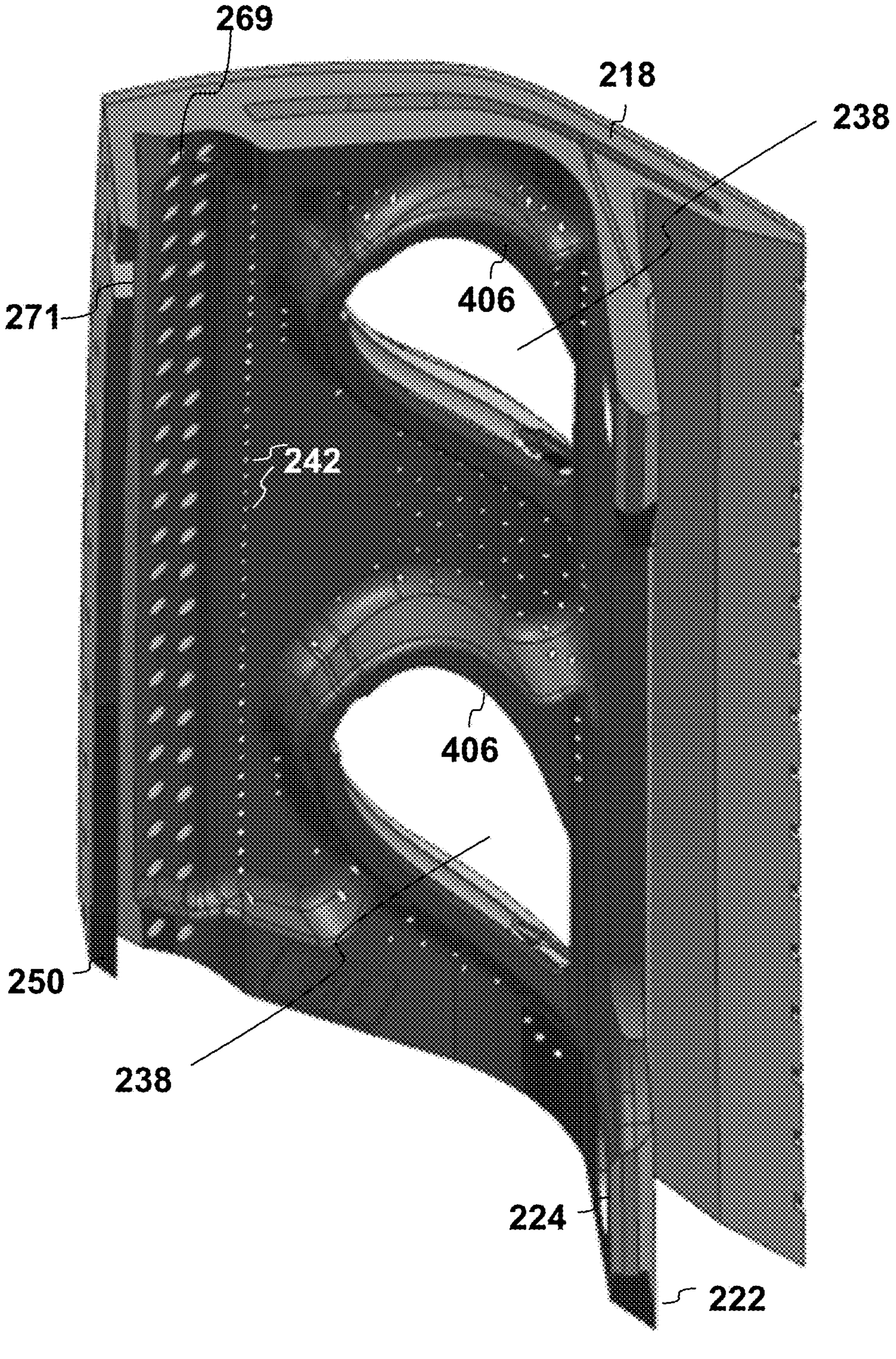
FIG. 7 is a view of the underside of the section shown in FIG. 6.
Figure 8:
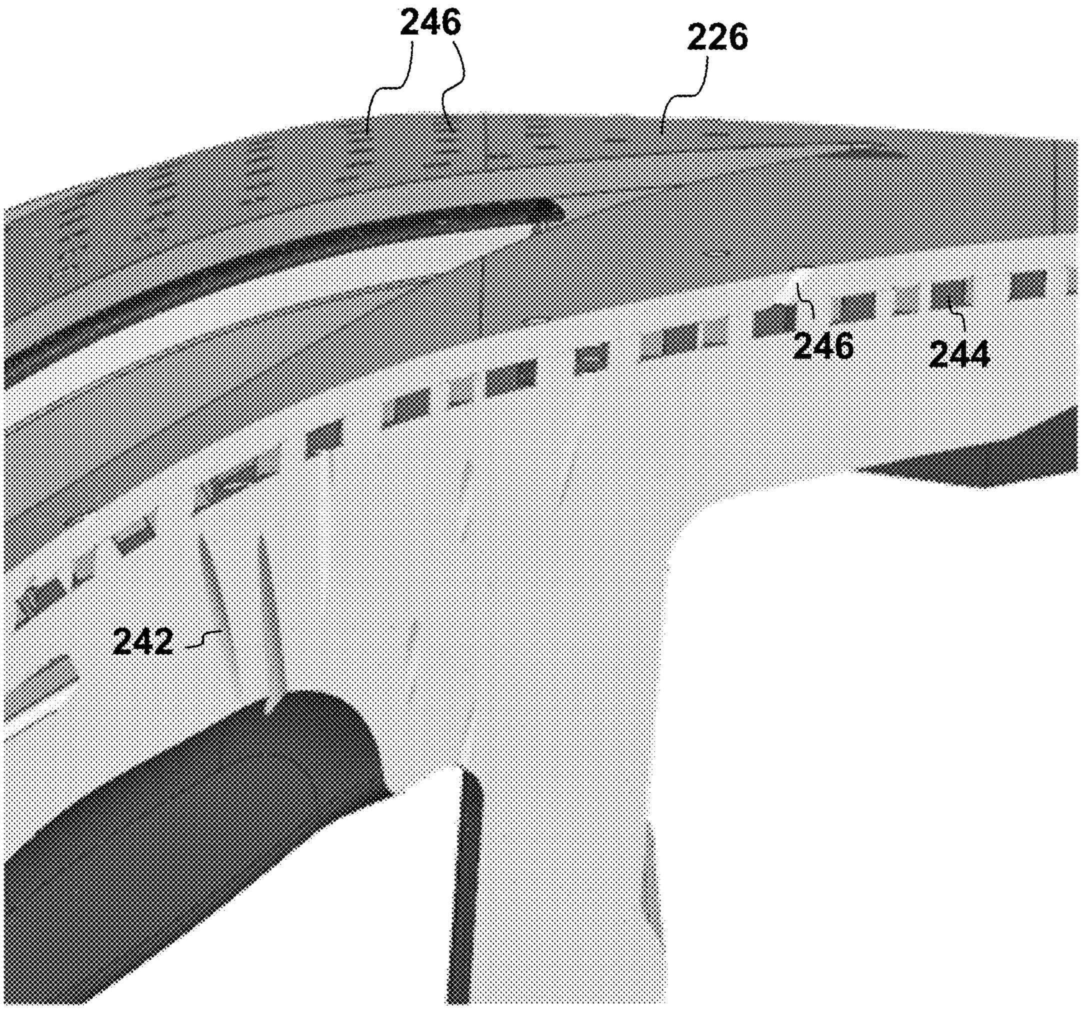
FIG. 8 is a sectional view showing certain details of the structure of FIGS. 6-7.

FIG. 6 is a perspective view of the radially inner vane endwall 218, but including an endwall coversheet, to be described below, and shown from a different angle than the view provided by FIG. 5. The endwall 218 shown in FIG. 6 is a slightly different design than the endwall 218 shown in FIG. 6. The frontside endwall surface 226 illustrated in FIG. 6 includes film holes 246 located aft of the flange 222 as well as in front of the flange, and the coversheet represented in FIG. 6 overlies, and is bonded to, the upstanding pedestals 252 represented in FIG. 5. The endwall shown in FIG. 6 is provided with primary cooling air feed holes 269, located well forward of the flange 222 by which the section 216 represented in FIG. 6 may be secured in position between the combustion section 130 and the turbine section 110 shown in FIG. 1. FIG. 7 is a view of the underside of the section 216 shown in FIG. 6, with the primary cooling air feed holes 269 and the holes 242 mentioned above being visible. FIGS. 6-7 illustrate that the holes 242 and 269 may be located forward of the flange 222, while the film holes 246 may be located both forward and aft of the flange 222. The cross-sectional view provided by FIG. 8 shows the channels 244 interconnecting the holes 242 and the film holes 246. The openings 224 (FIG. 7), again, are usable to secure the flange 222 and thus the overall vane sidewall 218 in place in the engine 100. An opening 271 in a leading-edge flange 250 is also usable to help secure the endwall 218 in place.

Referring now to FIGS. 1, 6, and 7, using sub-surface micro cooling, thermal cooling may be provided by delivery of air out the leading edge, for example by way of cooling air feed holes 273 (FIG. 6) adjacent the frontside endwall surface 226. The delivery angle may be selected to match the flow field coming off of the combustor, and it may also be desirable to have this flow impinge on the vane trailing edge to provide additional cooling relief. After delivery through the holes 273, the ejected flow may then turn downstream to provide some film protection.

The pedestals 252 may have any desired shape.

Figure 9:
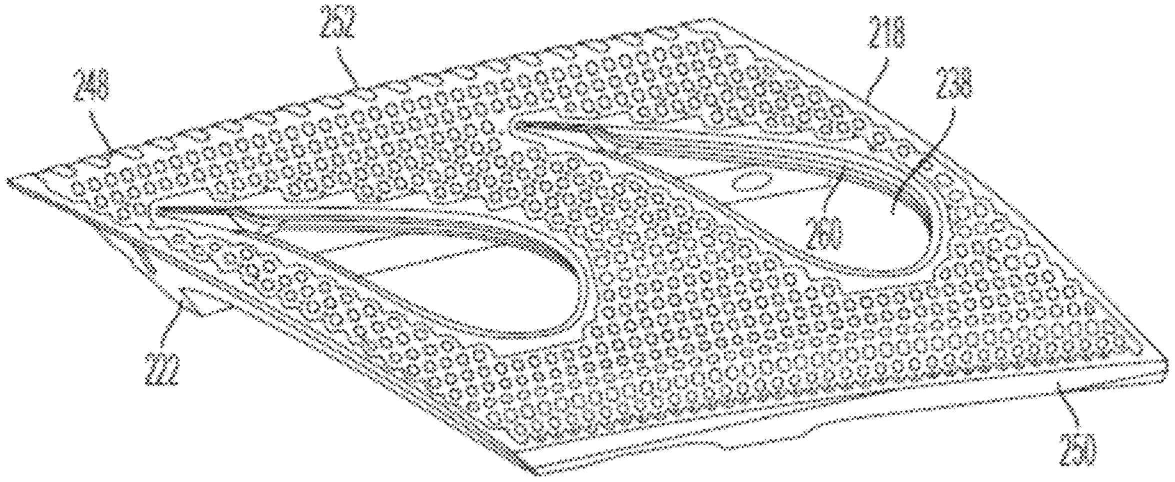
FIG. 9 illustrates a slightly modified form of the endwall shown in FIG. 5.

FIG. 9 illustrates a slightly modified form of the endwall 218 shown in FIG. 5, with the flanges 222 and 250 having somewhat reduced dimensions but otherwise with the endwall 218 shown in FIG. 9 is essentially the same as that shown in FIG. 5. Each opening 238 included in the endwall 218 may be dimensioned to receive an end 117 of one of the vanes 115 (FIG. 2), which may be secured in place in a way to be described below. In a manner similar to the arrangement of FIG. 5, pedestals 252 in the arrangement of FIG. 9 assist in directing the cooling fluid and supporting the coversheet (not shown).

Figure 10:
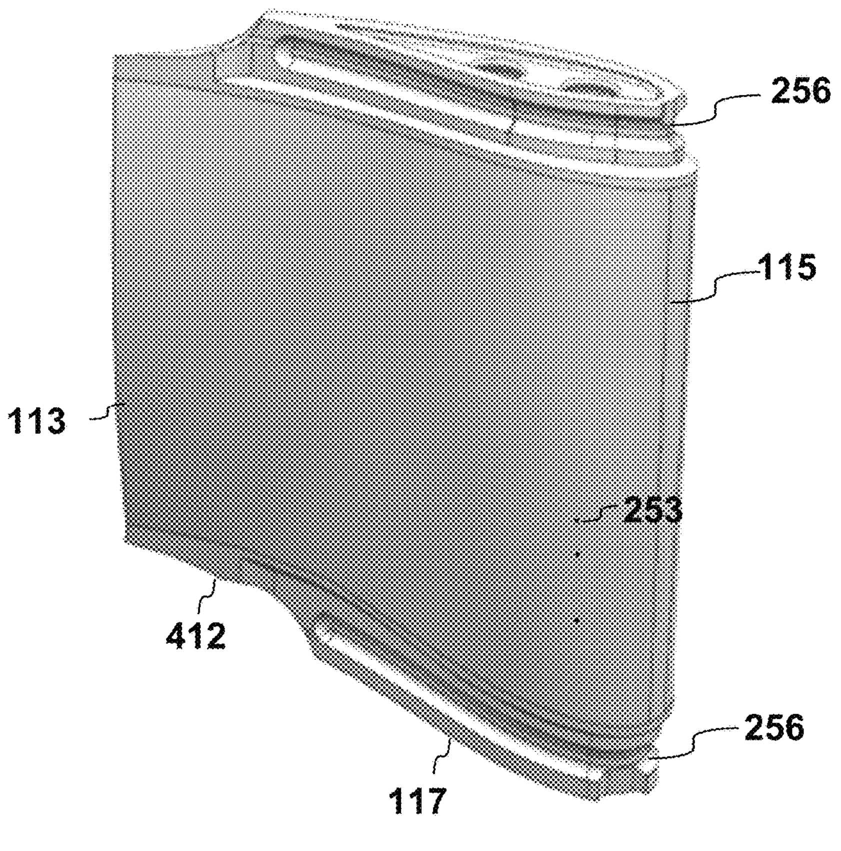
FIGS. 10-12, collectively, illustrate various aspects of a junction between a turbine vane and an endwall.

A lateral view of one of the stationary vanes 115 indicated in FIGS. 2, including a vane coversheet, is provided by FIG. 10. Shown in FIG. 10 are the stationary turbine vane trailing edge 113, vane film holes 253 distributed over the exterior of the vane 115, providing for flow of pressurized cooling fluid such as air from within the vane 115, and grooves 256 providing for interconnection of the vane 115 with the vane endwalls 218 and 220.

Figure 11:
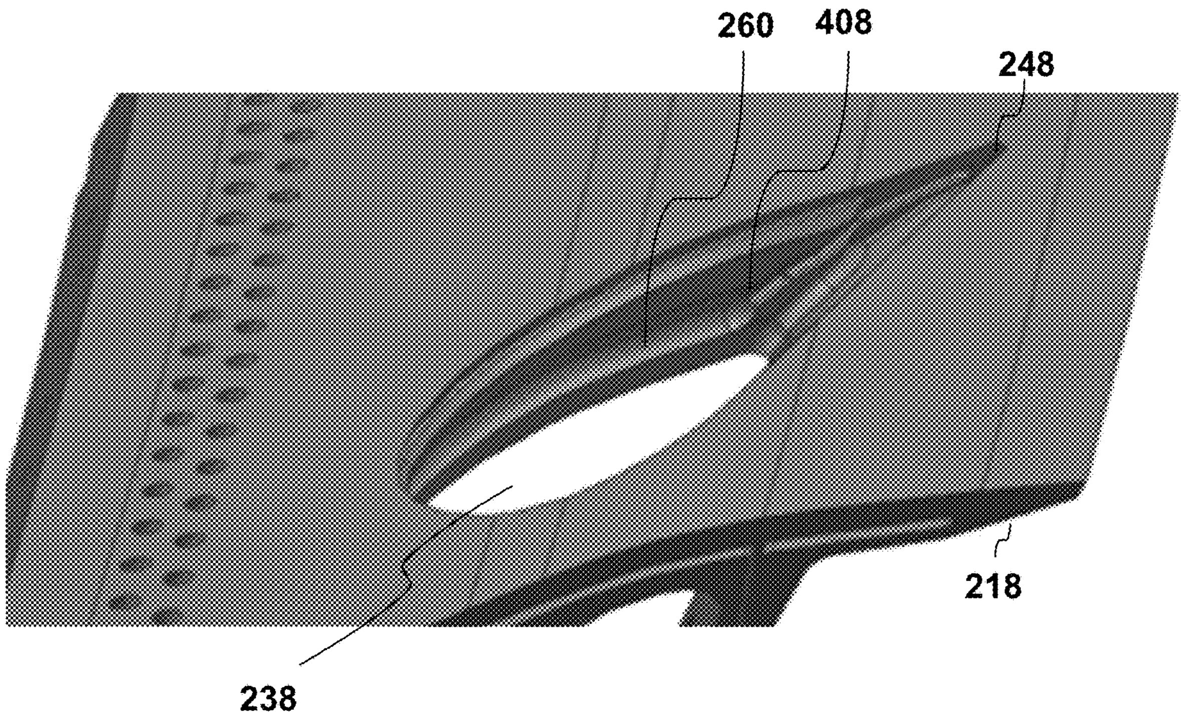

FIGS. 10 and 11 considered together illustrate how the vane 115 may be attached to the vane endwall 218 and 220 using a bi-cast process. As will be explained in more detail with reference to subsequent figures, the grooves 260 in the vane endwalls 218 and 220 and the grooves 256 at the ends of each stationary vane 115 may be filled with a different material, referred to as a bi-cast material, to lock the pieces together. The bi-cast material used to lock the endwalls and the vanes together needs to have a lower melting point than melting points of the endwalls and the vanes. The bi-cast material may be a metal alloy. The metal alloy may be a nickel or cobalt super alloy. The bi-cast material may include, for example, Mar-M247 or X40 for cast retainers, and a material such as WASPALLOY for a forged retainer.

Figure 12:
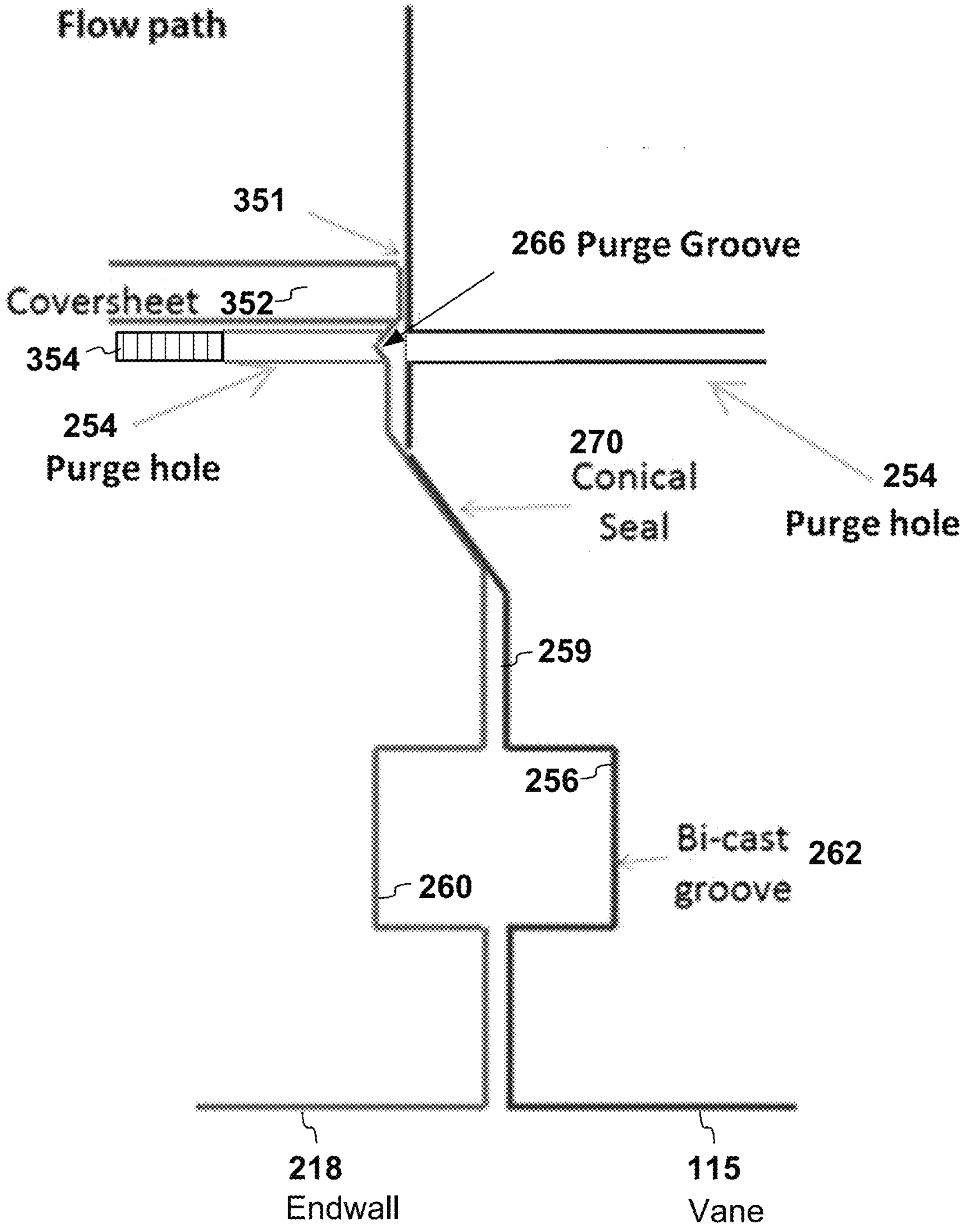

Referring now to FIGS. 9-12 collectively, a junction between one of the stationary vanes 115 and one of the vane endwalls, here the endwall 218, is described. When an end of a vane 115 is inserted into one of the vane openings 238 (FIG. 9) in the endwall 218, the groove 256 at one end of the vane 115 aligns with a groove 260 in the endwall 218. This is illustrated in FIG. 12. The aligned grooves 256 and 260 together form a bi-cast groove 262.

Referring once again to FIGS. 7 and 9, due to the presence of a reinforcing ridge 406 around the circumference of each of the endwall openings 238, it may be difficult to include holes 242 near the openings 238 without mechanically weakening the area. As a result, it may be difficult to adequately supply cooling fluid to this area of the endwall, here the endwall 218, particularly adjacent to the vane trailing edge 113 (FIGS. 2 and 10) where an end of the vane 115 is received in one of the openings 238. Turning again to FIG. 11, when the vane 115 (not shown in FIG. 11) is positioned in the endwall 218 for attachment to the endwall 218 using the bi-cast material, from an end point 408 of the groove 260 back towards a point 248 where the trailing edge 113 of the endwall 218 is received, the vane groove 256 (FIGS. 10 and 12) has terminated, while the endwall groove 260 (FIGS. 11 and 12) tapers and decreases in volume, with bi-cast material nonetheless remaining within the endwall groove 260 to form a piston ring.

Figure 13:
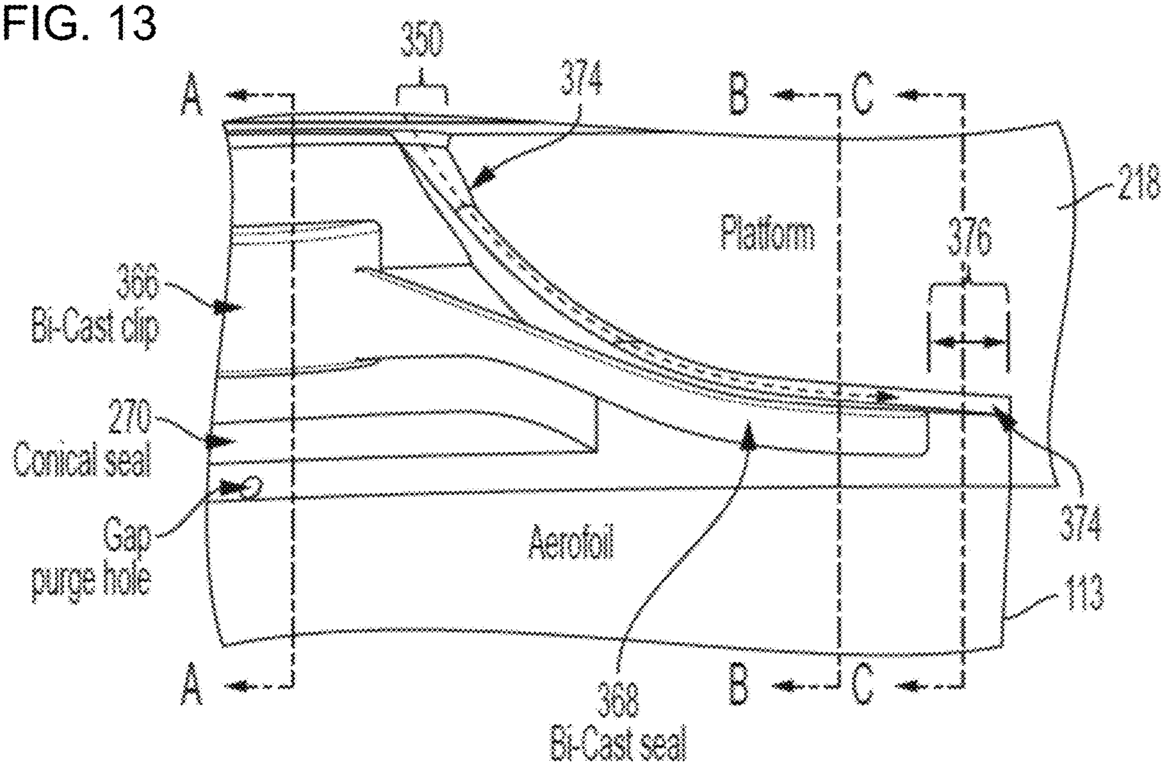
FIG. 13 is a cross-sectional view in which a vane, an endwall, a bi-cast seal, and a bi-cast clip are all shown.
Figure 14:
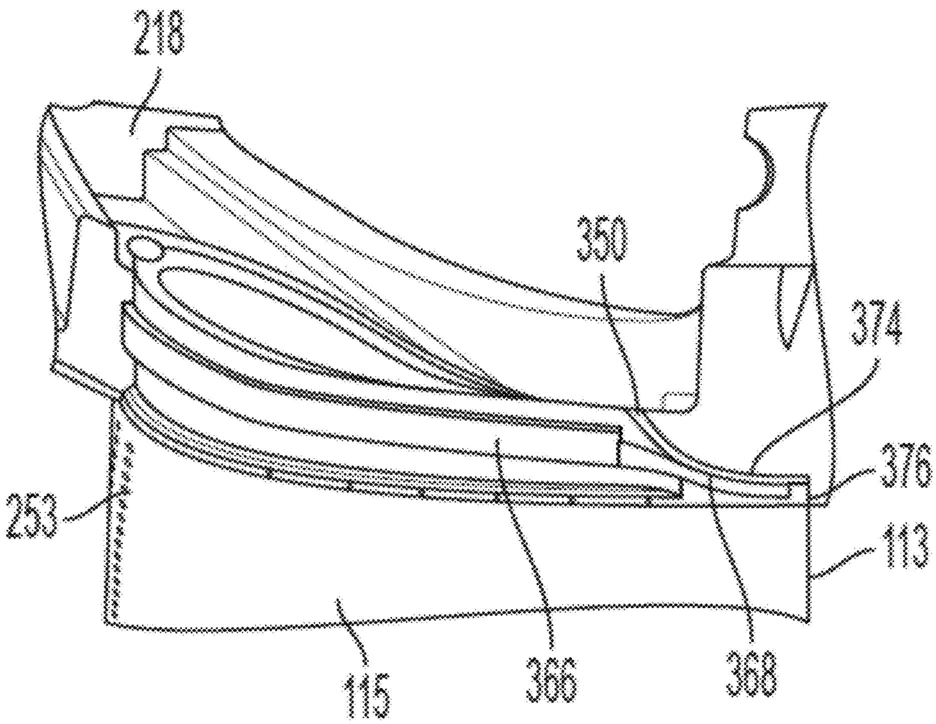
FIG. 14 is a schematic perspective view of an end of a guide vane received in one of the vane openings in the endwall.
Figure 15:
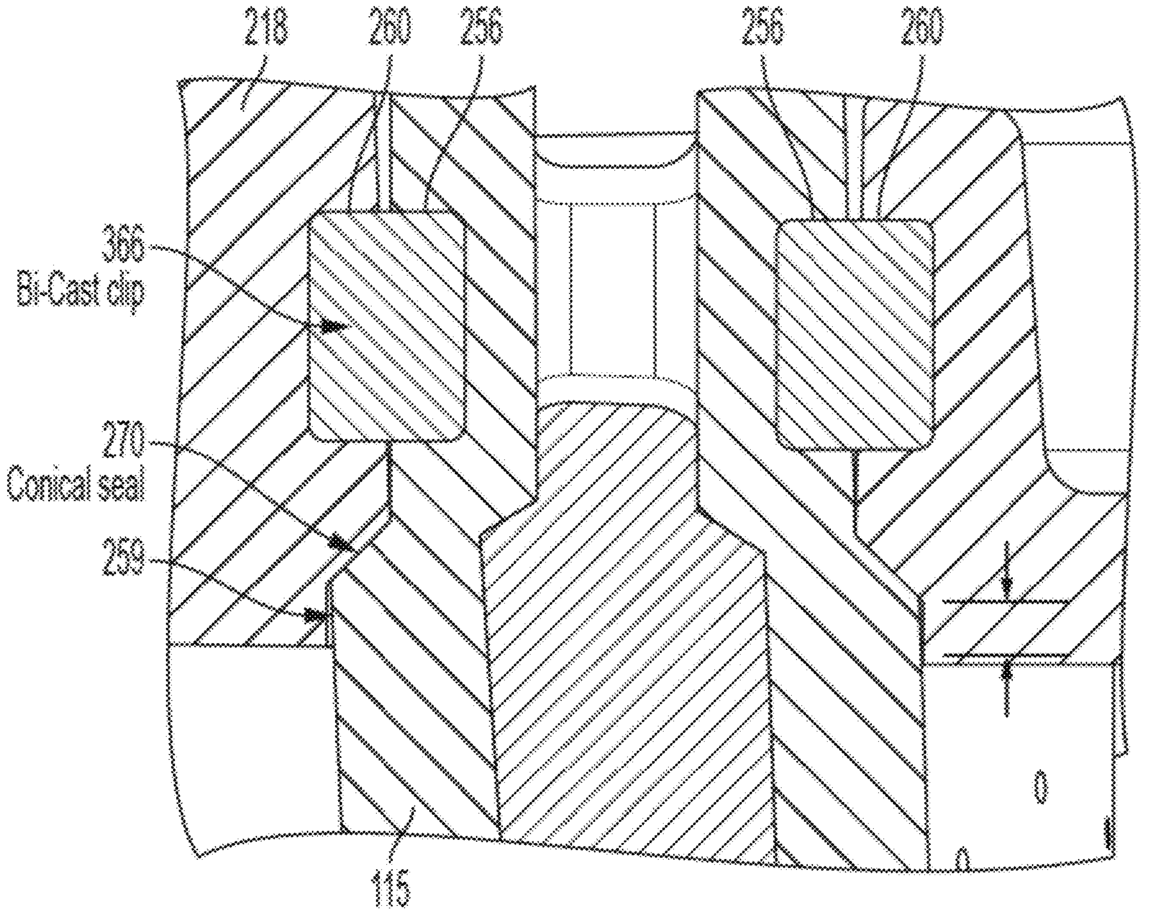
FIG. 15 is a cross-sectional view along line A-A in FIG. 13.
Figure 16:
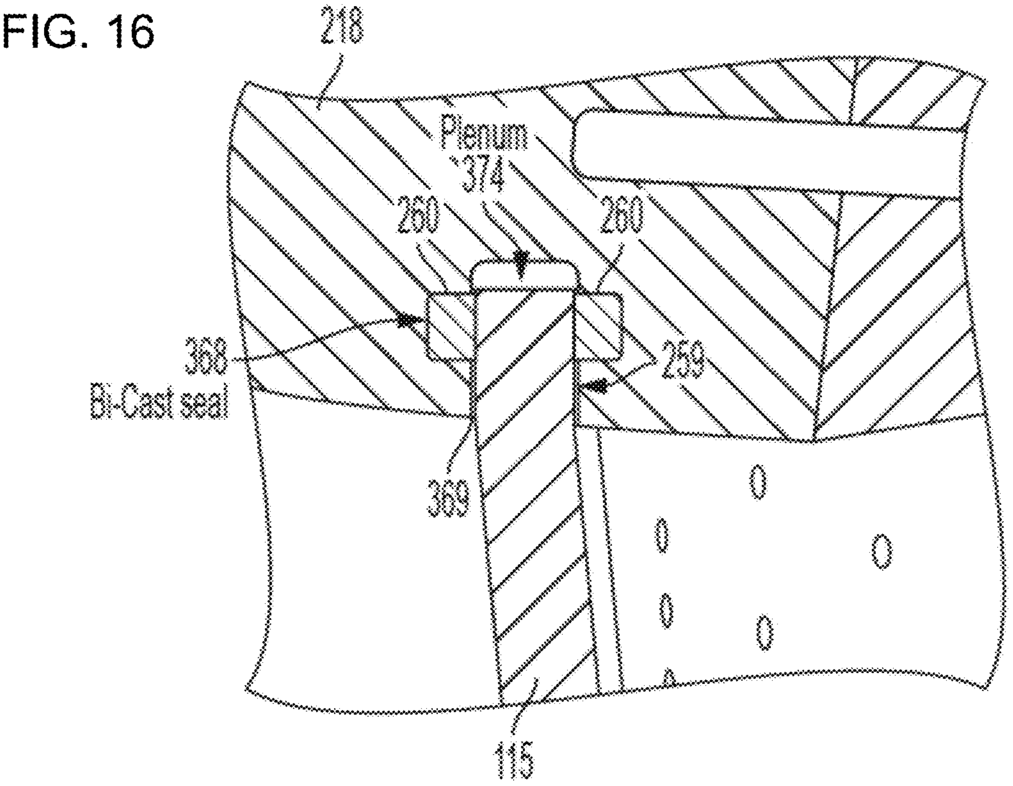
FIG. 16 is a cross-sectional view along line B-B in FIG. 13.
Figure 17:
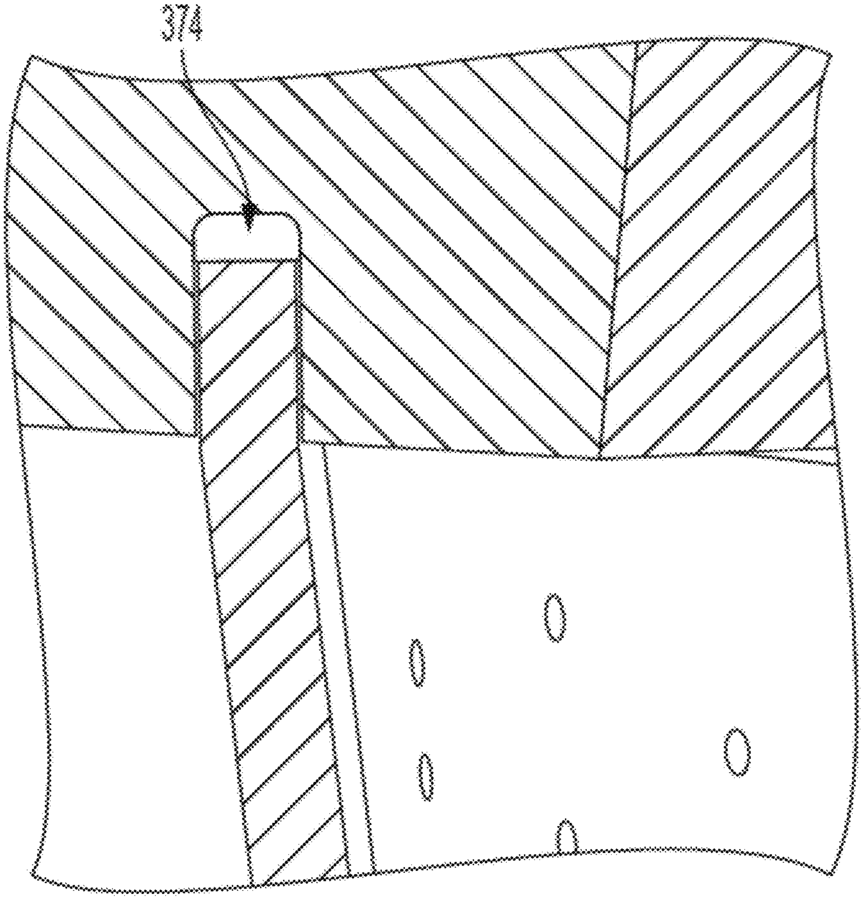
FIG. 17 is a cross-sectional view along line C-C of FIG. 13.

FIGS. 13-17, collectively, show the junction between one of the vanes 115 and one of the vane endwalls. The view supplied by FIG. 12 showing the junction between the vane 115 and the endwall 218 is in an orientation that is inverted relative to the views supplied by FIGS. 13-17. FIG. 13 is a cross-sectional view of the junction taken in a plane that chordwise bisects the vane 113. FIG. 14 is a schematic perspective view of an end of the vane 115 received in one of the vane openings in the endwall 218. FIG. 15 is a cross-sectional view along line A-A in FIG. 13, in which the vane 115, the endwall 218, and a bi-cast clip 366 are all shown. FIG. 16 is a view along line B-B in FIG. 13, in which the stationary vane 115, the bi-cast seal 368 and the endwall 218 are all shown. It may be seen from FIGS. 13, 14, 16, and 17 that a plenum 374 for receiving cooling fluid is formed between the vane 115 and the endwall 218. The plenum 374 also permits the vane 115 to undergo expansion and contraction resulting from temperature changes. FIG. 17 is a view along line C-C of FIG. 13, and illustrates that neither the bi-cast clip 366 nor the bi-cast seal 368 is present at this location. The plenum 374 is permitted in this way to extend all the way from an airflow gap 350 (FIGS. 13, 14, and 18) between the endwall 218 and the vane 115 to a trailing end 376 of the plenum 374 located at or adjacent to the trailing edge 113 of the vane 115. By way of an arrangement such as that described, the bi-cast material, i.e. molten metal with a melting point lower than the melting points of the endwall and airfoil materials, may be injected into the groove 262 (FIG. 12) so that when the bi-cast material solidifies, the injected metal forms the clip 366 (FIG. 14) and the seal 368 (FIG. 14) that keep the endwall 218 and the vane 115 engaged. The bi-cast element visible in FIG. 13 is thus composed of two parts, which may be integrally formed. The bi-cast clip 366 defines a first part of the bi-cast element, while the bi-cast seal 368 defines a second part of the bi-cast element. The clip 366 and the seal 368 may be made of the same material, and may be produced together or separately. This allows the vane 115 and the endwall 218 (and the endwall 220 as well) to be manufactured independently. One issue associated with this process, however, is that the bi-cast material loses its strength at a lower temperature than the other materials and yet it is under very high sheer forces. Accordingly, the bi-cast material should be cooled and kept relatively cool thereafter. During operation of the gas turbine engine, keeping the bi-cast material sufficiently cool in locations near the thickened endwall portions forming the reinforcing ridges 406 surrounding the airfoil pockets has been problematic, particularly around the trailing edge 113 of the vane 115. Cooling air received in the plenum 374 from the airflow gap 350 may assist in making and keeping the bi-cast material cool in order to address this issue. The bi-cast seal 368 and the plenum 374 may be cooled together. The bi-cast seal 368 may be used to hinder hot gases from the primary flow path flowing up through a gap 259 (FIG. 16) between the vane 115 and the endwall 218. The gap 259 may extend between the bi-cast seal 368 and an outer edge 369 of the endwall 218 that is adjacent to the vane 115. The gap 259 may extend to the trailing end 376 of the plenum 374 and/or to the trailing edge 113 of the vane 113 (FIG. 13).

During construction of the bi-cast seal 368, ceramic felt, which pyrolyzes at a lower temperature (1,900-2000 degrees F.) than the bi-cast material (2,700 degrees F.), may fill the plenum 374 before the bi-cast material is introduced. After the ceramic felt is pyrolyzed, the resultant material may be blown out.

Turning now to the view along line A-A in FIG. 13 provided by FIG. 15, the bi-cast material may be seen as occupying both the vane groove 256 and the endwall groove 260. This part of an overall bi-cast element forms the bi-cast retaining clip 366 that locks each vane 115 and the endwall 218 together. A gap 259 may remain between sections of the endwall 218 and the vanes 112 disposed between the conical seal 270 and the bi-cast groove 262. The gap 259 may be, for example, around 0.075 mm in width by around 1.0 mm in length. In some examples, the gap 259 may have a width greater than zero and less than or equal to 1.0 mm. Moving aft to the view along line B-B in FIG. 13 provided by FIG. 16, the vane groove is lost, and only the endwall groove 260, of decreased size, remains, such that the bi-cast material remaining in the endwall groove 260 forms another part of the overall bi-cast element. This part of the bi-cast element forms the bi-cast seal 368, which may also be referred to as a piston ring, as it allows limited sliding of the vane 115 while also providing a seal that prevents excessive air leakage out of the plenum 374 into the primary flow path. Proceeding further rearwardly to the view along line C-C in FIG. 13 illustrated by FIG. 17, both the vane groove 256 and the endwall groove 260 have ended. As mentioned, the bi-cast seal 368 may terminate approximately 2 mm from the platform formed by the endwall 218. By way of a construction such as that represented in FIGS. 13-16, the trailing edge 113 of the airfoil vane 115 may be mechanically separated or set off from the endwall platform 218 to accommodate thermal expansion. A conical seal 270 shown in FIGS. 12-13 and 15 may be formed by cooperating surfaces of the endwall 218 and the vane 115. These cooperating surfaces, which are discussed further below, may be placed in contact to aid in relative positioning of the vane 115 and the platform 218 and then secured in place by provision of the bi-cast element. Viewing FIGS. 9-11 once again, a transition surface 412 is shown as interconnecting an axial end (in other words, radial end) of the vane 115 with the vane trailing edge 113. Matching the transition surface 412 with the contour of the endwall opening 238 may be problematic in terms of machining, and a clearance, referred to earlier as the airflow gap 350, may remain between the vane 115 and the endwall 218 at this location (See, for example, FIG. 18). The airflow gap 350 advantageously may serve as an opening to the plenum 374 through which cooling fluid may be supplied to the plenum.

Referring again to FIG. 12, a vane-coversheet gap 351 is defined between the vane 115 and a coversheet 352 on the surface of the endwall 218. The coversheet 352 may be used to assist in suitably adjusting the gap 351 between the endwall 218 and the vane 115.

When properly aligned, engagement of corresponding surfaces of the relevant vane 115 and the endwall 218 produces the conical seal 270 to inhibit undesired coolant bleeding. One example of a conical seal arrangement is provided by U.S. Patent Application Publication US 2016/0177749 A1 to Brandl et al. The coversheet 352 may assist in properly sizing the vane-coversheet gap 351 to reduce issues associated with thermal expansion and contraction. Referring now to FIG. 12, a purge groove 266 between the endwall 218 and the vane 115 may be fed by an endwall cooling circuit 354. The endwall cooling circuit 354 may include, for example, the feed holes 242 shown in FIGS. 7-8 and/or the channels 244 shown in FIGS. 5 and 8. Alternatively, or in addition, the purge groove 266 may be fed by one or more purge holes 254 in the vane 115. The purge holes 254 in the vane 116 may be in fluid communication with a central cavity (not shown) of the vane 115. Hot gasses from the primary flow may enter the vane-coversheet gap 351, which is located between the coversheet 352 and the vane 115, and oxidize surfaces of the conical seal 270. To prevent entry of these hot gasses and/or to compensate for hot gases that do enter the vane-coversheet gap 351 from the primary flow, the cooling fluid may be introduced into the purge groove 266 from the endwall cooling circuit 354 and/or from the one or more feed holes 242 in the vane 115.

FIG. 14 illustrates an end of the guide vane 115 received in one of the vane openings 238 (FIG. 9) in the endwall 218. The vane trailing edge 113, the vane film holes 253, the vane-coversheet gap 351, the bi-cast clip 366 the plenum 374, and the plenum end 376 are also visible in FIG. 14.

Figure 18:
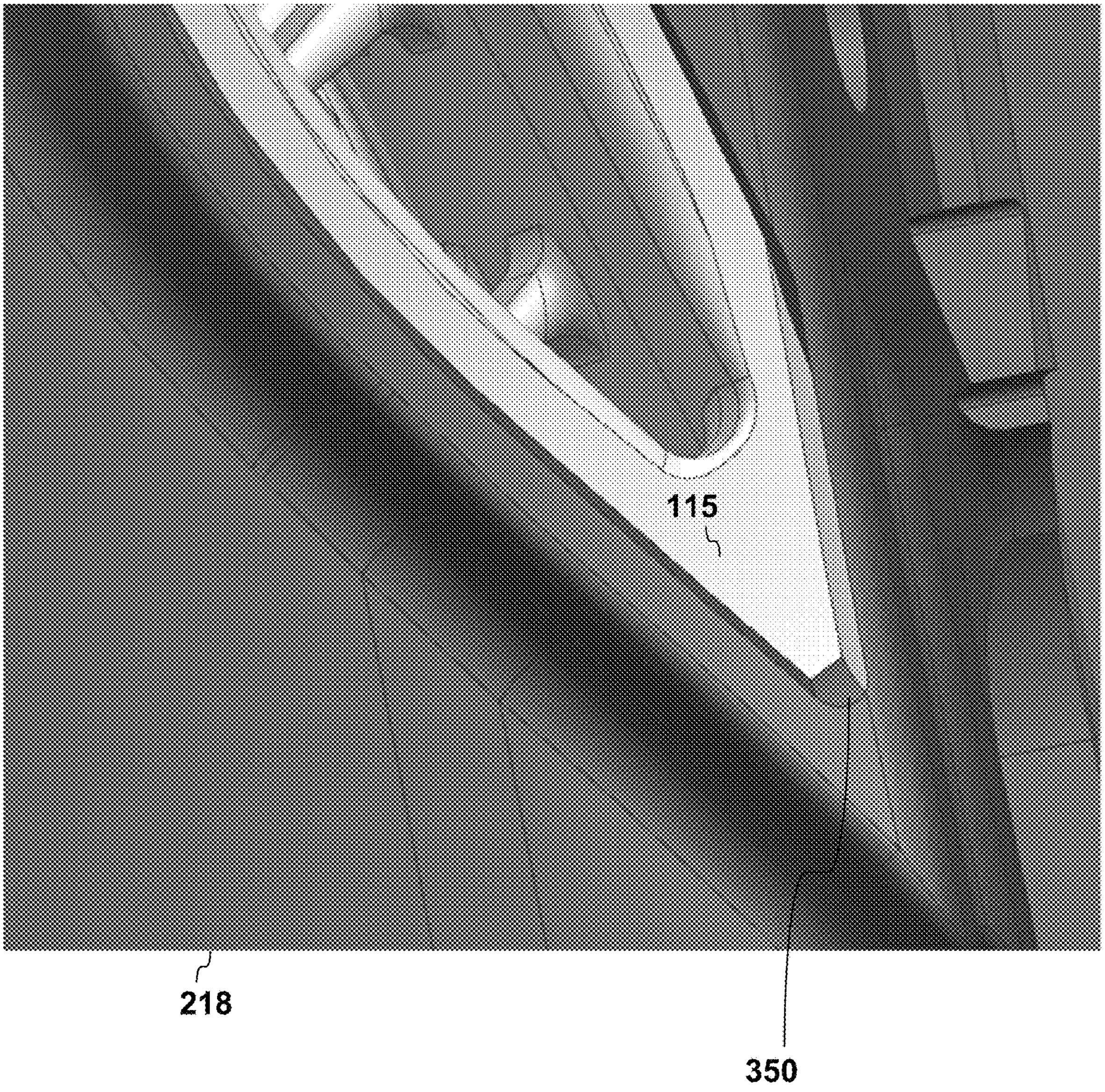
FIG. 18 is a perspective view of a view of a junction between a vane and an endwall.

FIG. 18 is a perspective view of a view of a junction between the vane 115 and the endwall 218 showing the airflow gap 350. FIG. 18 is a view of the radially inward surface of the endwall 218 if the endwall 218 is an inner endwall or a radially outward surface of the endwall 218 if the endwall 218 is an outer endwall. In other words, FIG. 18 is a view of a "cold side" of the endwall 218.

Figure 20:
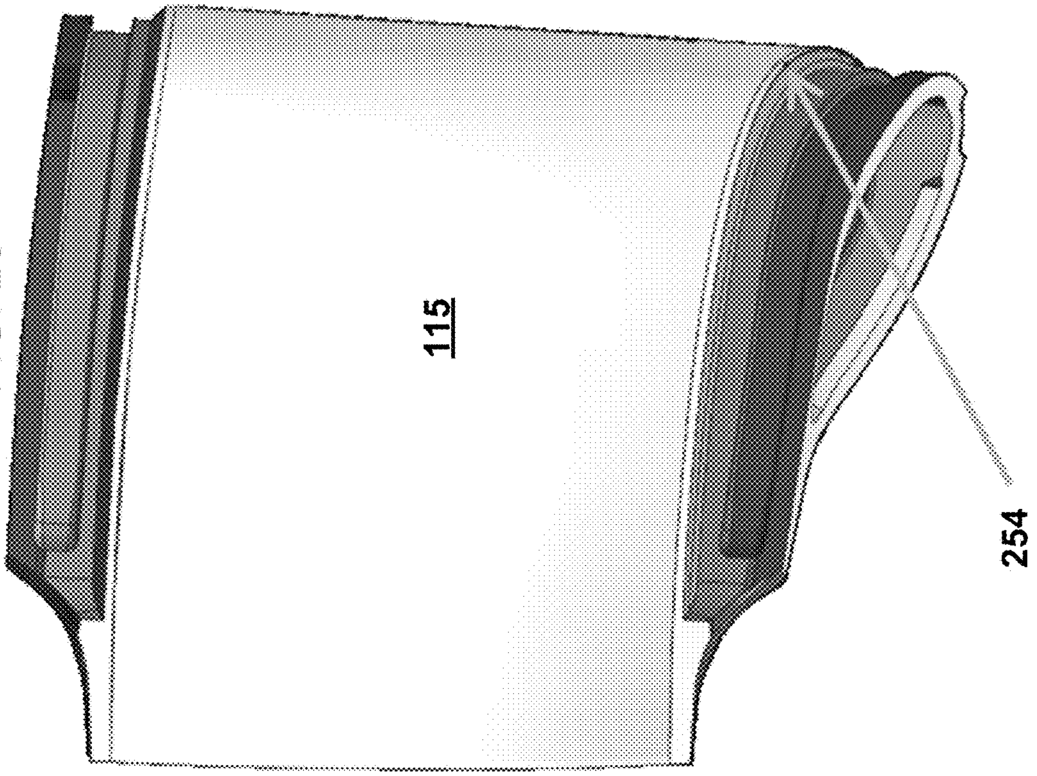
FIG. 20 is a perspective view of a suction side a guide vane showing an example location of a purge hole.
Figure 19:
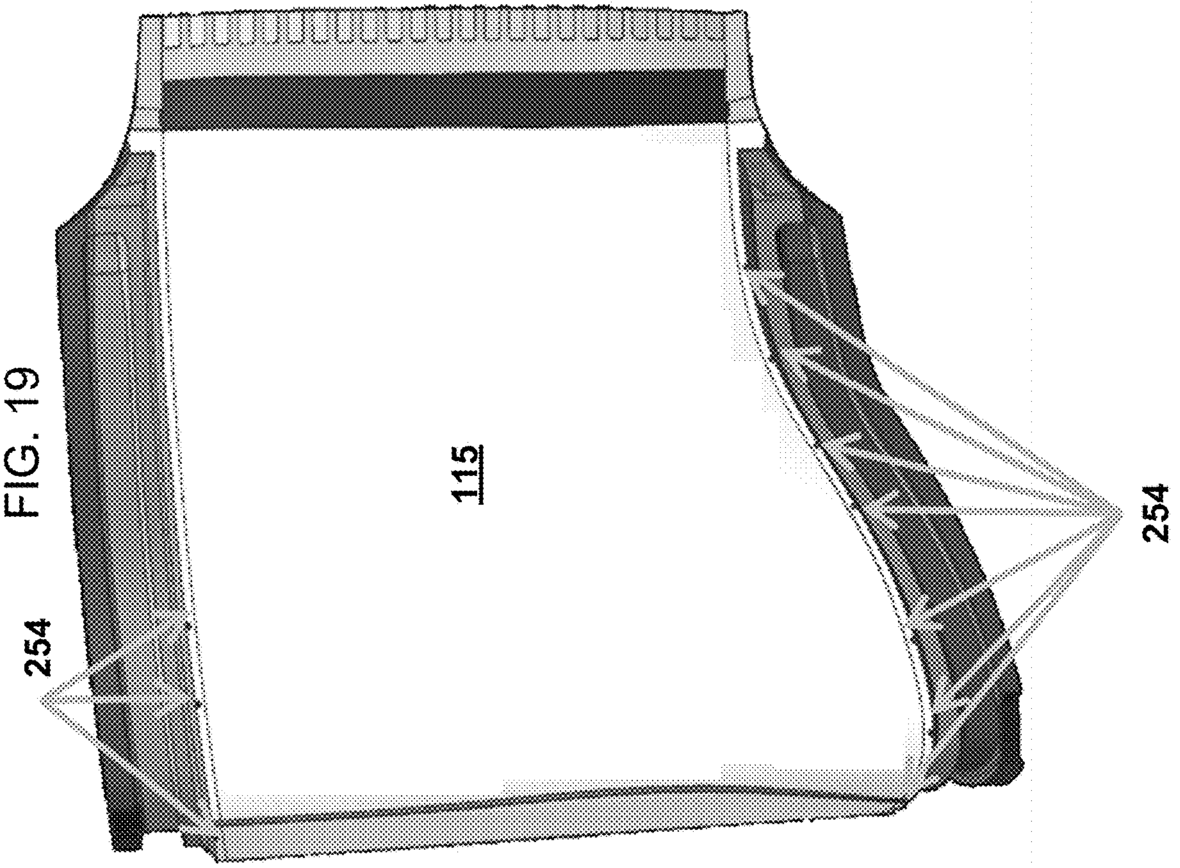
FIG. 19 is a perspective view of pressure side of a guide vane showing example locations of purge holes.

FIG. 19 is a perspective view of a pressure side of the vane 115 showing example locations of the purge holes 254. FIG. 20 is a perspective view of a suction side the vane 115 showing an example location of the purge hole 254. The vane 115 may include fewer or a greater number of the purge holes 254 than shown. Alternatively or in addition, the vane 115 may include the purge holes 254 in different locations than shown. In some examples, the vane 115 may not include any purge holes 254: instead, the endwall 218 may include the purge holes. In still other examples, only the vane 116 includes the purge holes 254 and the endwall 218 includes no purge holes 254. In some examples, both the vane 116 and the endwall 218 include one or more of the purge holes 254.

In the illustrated examples, the vane 115 and endwall 218 are attached with the bi-cast element. However, in other examples, the vane 115 and endwall 218 may be attached to each other with a different mechanism.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a gas turbine nozzle guide vane structure including a vane 115 shaped as an airfoil and having a vane trailing edge 113, an endwall 218 including an opening 238 to receive an end 117 of the vane 115, and an element 366, 368 securing the endwall 218 and the vane 115 to each other. Clearance remaining between the endwall 218 and the vane 115 defines a plenum 374 to feed cooling air to the vane 115 at a location adjacent the vane trailing edge 113.

A second aspect relates to the gas turbine nozzle guide vane structure according to the first aspect, wherein the element securing the endwall 218 and the vane 115 to each other is a bi-cast element 366, 368.

A third aspect relates to the gas turbine nozzle guide vane structure according to the second aspect, wherein the element 366, 368 securing the endwall 218 and the vane 115 to each other includes a first portion defining a bi-cast clip 366 received in opposed grooves 256, 260 provided in the endwall 218 and the vane 115.

A fourth aspect relates to the gas turbine nozzle guide vane structure according to the third aspect, wherein the element 366, 368 securing the endwall 218 and the vane 115 to each other further includes a second portion 368 defining a bi-cast seal received in only one 260 of said grooves 256, 260 provided in the endwall 218 and engaging a lateral exterior surface 117 of the vane 115.

A fifth aspect relates to the gas turbine nozzle guide vane structure according to the fourth aspect, wherein the plenum 374 has an end 376 aligned with the vane trailing edge 113.

A sixth aspect relates to the gas turbine nozzle guide vane structure according to the fifth aspect, wherein the bi-cast seal 368 terminates at a distance from the end 376 of the plenum 374. In certain arrangements, this distance may be approximately 2 mm, and lateral surfaces of the vane 115 and the endwall 218 may define gaps 259 at opposed sides of the vane 115.

A seventh aspect relates to a clearance remaining between the endwall 218 and the vane 115 forming gaps 259 between sections of the endwall 218 and the vane 115 to accommodate relative expansion and contraction of the vane 115 and the endwall 218.

An eighth aspect relates to a purge groove 266 defined in at least one of the endwall 218 and the vane 115 located between the endwall 218 and the vane 115 to receive cooling fluid supplied through at least one of the endwall 218 and the vane 115. In certain arrangements, the structure may include a coversheet 352 on the endwall 218 defining a gap 351 with the vane 115, with the purge groove 266 further receiving cooling air supplied through the gap 351.

In addition to features mentioned in each of the independent aspects enumerated above, some examples may show, alone or in combination, the optional features mentioned in the dependent aspects and/or as disclosed in the description above and shown in the figures.

What is claimed is:

1. A gas turbine nozzle guide vane structure comprising:
- a vane shaped as an airfoil and having a vane trailing edge;
- an endwall including an opening to receive an end of the vane; and
- an element securing the endwall and the vane to each other with clearance between the endwall and the vane defining a plenum to feed cooling air to the vane at a location adjacent the vane trailing edge, wherein
- the element securing the endwall and the vane to each other further comprises:
  - a portion defining a bi-cast seal received in a groove provided in the endwall and engaging a lateral exterior surface of the vane instead of an opposing groove of the vane.

2. The gas turbine nozzle guide vane structure according to claim 1, wherein
- the element securing the endwall and the vane to each other is a bi-cast element.

3. The gas turbine nozzle guide vane structure according to claim 1, wherein
- the portion is a first portion; and
- the element securing the endwall and the vane to each other includes a second portion defining a bi-cast clip received in the opposed grooves provided in the endwall and the vane.

4. The gas turbine nozzle guide vane structure according to claim 1, wherein
- the plenum has an end aligned with the vane trailing edge.

5. The gas turbine nozzle guide vane structure according to claim 4, wherein
- the bi-cast seal terminates at a distance from the end of the plenum.

6. The gas turbine nozzle guide vane structure according to claim 5, wherein the distance is approximately 2 mm.

7. The gas turbine nozzle guide vane structure according to claim 3, wherein
- lateral surfaces of the vane and the endwall define gaps at opposed sides of the vane.

8. A gas turbine nozzle guide vane structure comprising:
- a vane shaped as an airfoil and having a vane trailing edge;
- an endwall including an opening to receive an end of the vane; and
- an element securing the endwall and the vane to each other with clearance remaining between the endwall and the vane forming gaps between portions of the endwall and the vane to accommodate relative expansion and contraction of the vane and the endwall, wherein
- the element securing the endwall and the vane to each other further comprises:
  - a portion defining a bi-cast seal received in a groove provided in the endwall and engaging a lateral exterior surface of the vane instead of an opposing groove of the vane.

9. The gas turbine nozzle guide vane structure according to claim 8, wherein the gap has a length of approximately 1.0 mm.

10. The gas turbine nozzle guide vane structure according to claim 8, wherein the element securing the endwall and the vane to each other is a bi-cast element.

11. The gas turbine nozzle guide vane structure according to claim 10, wherein
- the element securing the endwall and the vane to each other includes a portion defining a bi-cast clip received in opposed grooves provided in the endwall and the vane.

12. The gas turbine nozzle guide vane structure according to claim 11, wherein
- the portion is a first portion; and
- the element securing the endwall and the vane to each other further includes a second portion defining a bi-cast seal received the groove provided in the endwall and engaging a lateral exterior surface of the vane instead of the groove of the vane.

13. A gas turbine nozzle guide vane structure comprising:
- a vane shaped as an airfoil and having a vane trailing edge;
- an endwall including an opening to receive an end of the vane; and
- an element securing the endwall and the vane to each other with clearance between the endwall and the vane defining a plenum to feed cooling air to the vane at a location adjacent the vane trailing edge, the element securing the endwall and the vane to each other including
  - a first portion defining a bi-cast clip received in opposed grooves provided in the endwall and the vane, and
  - a second portion defining a bi-cast seal received in the groove provided in the endwall and engaging a lateral exterior surface of the vane instead of the groove of the vane, wherein the plenum has an end aligned with the vane trailing edge.

14. The gas turbine nozzle guide vane structure according to claim 13, wherein the element securing the endwall and the vane to each other is a bi-cast element.

15. The gas turbine nozzle guide vane structure according to claim 13, wherein the bi-cast seal terminates at a distance from the end of the plenum.

16. The gas turbine nozzle guide vane structure according to claim 15, wherein the distance is approximately 2 mm.

17. The gas turbine nozzle guide vane structure according to claim 13, wherein lateral surfaces of the vane and the endwall define gaps at opposed sides of the vane.

* * * * *